United States Patent

[11] 3,598,166

| [72] | Inventor | Thomas A. Wells |
| | | Spartanburg, S.C. |
| [21] | Appl. No. | 734,919 |
| [22] | Filed | June 6, 1968 |
| [45] | Patented | Aug. 10, 1971 |
| [73] | Assignee | Deering Milliken Research Corporation |
| | | Spartanburg, S.C. |

[54] ENDLESS REINFORCEMENT FOR PNEUMATIC TIRES
23 Claims, 4 Drawing Figs.

[52] U.S. Cl.................................................. 152/361,
156/128, 156/175, 156/181, 161/58, 161/144,
242/26, 242/43, 242/178
[51] Int. Cl.................................................. B60c 9/18
[50] Field of Search........................................ 161/47, 57,
58, 59, 142, 144; 152/354, 355, 356, 361; 74/239;
198/193; 156/124, 128, 173, 175, 181; 242/174,
178, 26, 43

[56] References Cited
UNITED STATES PATENTS
| 486,745 | 11/1892 | Wardwell................ | 242/178 |
| 533,688 | 2/1895 | Wardwell................ | 242/26 |
| 2,982,327 | 5/1961 | Vanzo et al............. | 152/361 |
| 3,422,874 | 1/1969 | Weitzel.................. | 156/126 |
| 2,934,126 | 4/1960 | Wilson................... | 161/92 |
| 3,024,828 | 3/1962 | Smith et al............. | 152/361 |

FOREIGN PATENTS
| 1,268,334 | 6/1961 | France |
| 351,313 | 5/1905 | France................ | 152/359 |

Primary Examiner—Robert F. Burnett
Assistant Examiner—James J. Bell
Attorneys—Norman C. Armitage and H. William Petry ABSTRACT: An endless reinforcement strip for a pneumatic tire which comprises continuous cord forming a generally zigzag pattern and being positioned across the width of the strip from one side to the other at an angle to the edges of the strip with reversals at the edges. Lengths of the cord between reversals are interleaved with lengths disposed at an opposite angle along at least one line substantially parallel to and intermediate the edges of the strip.

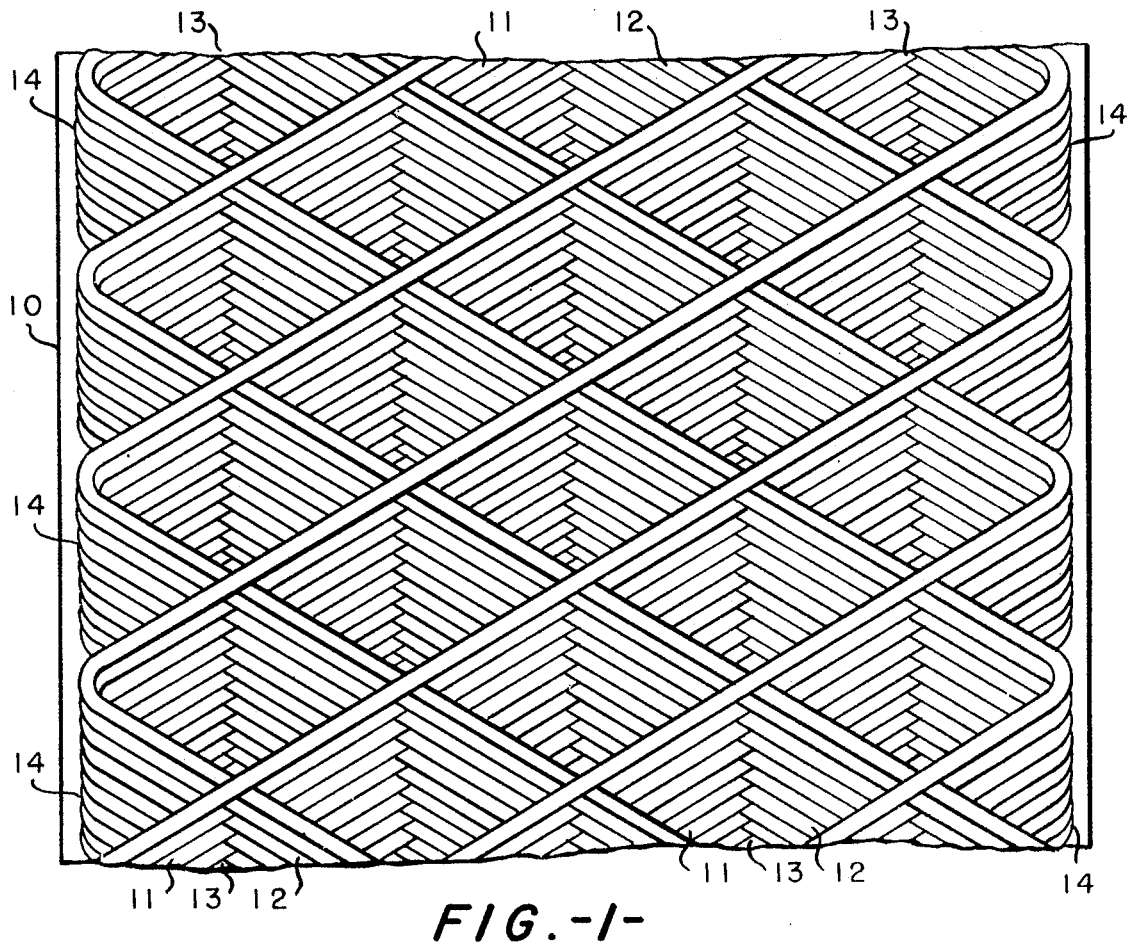
FIG.-1-
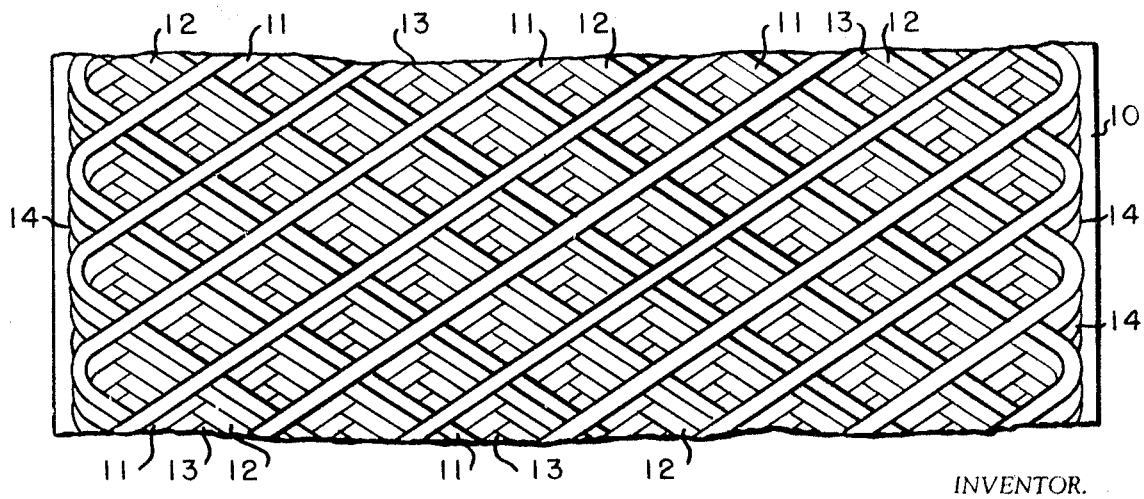
FIG.-2-

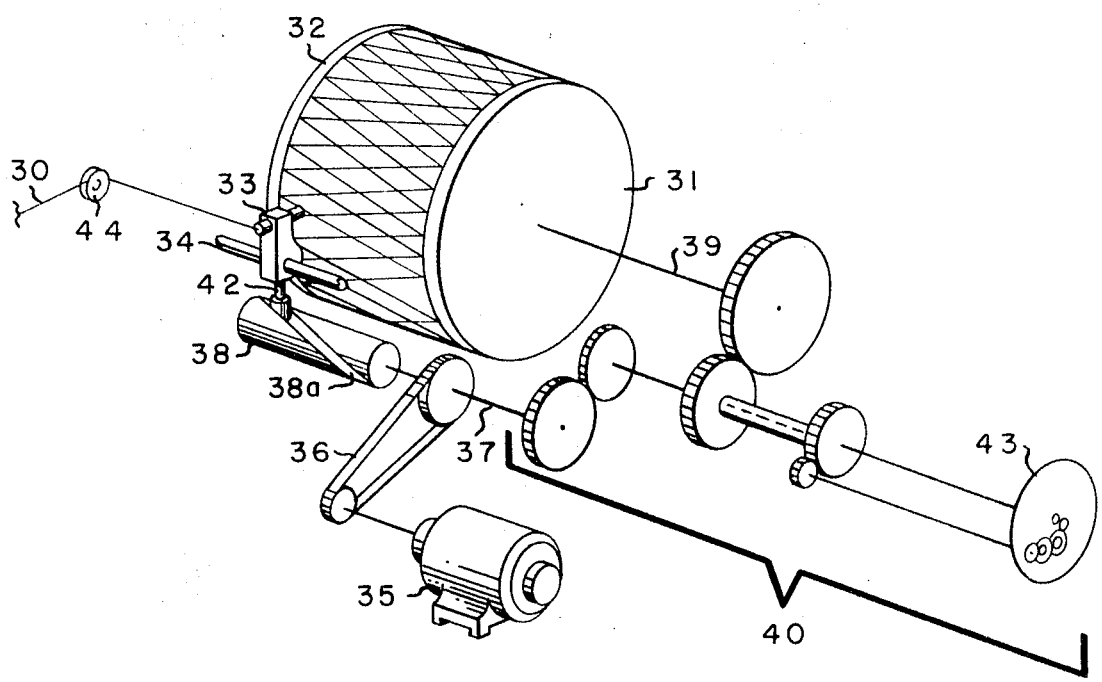
FIG.-4-
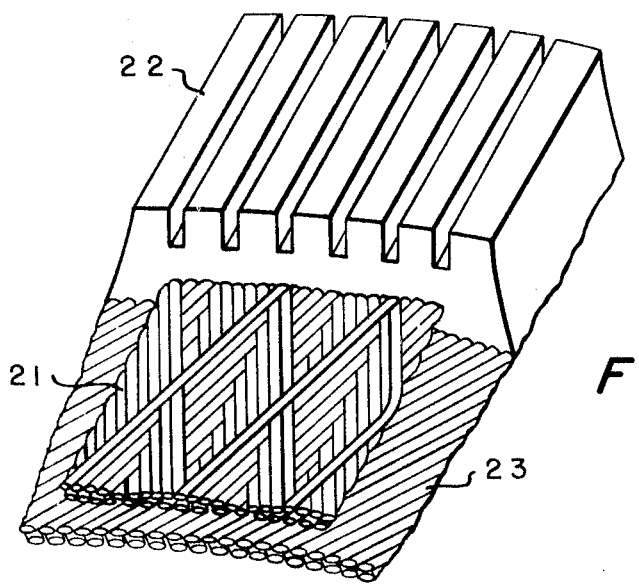
FIG.-3-
INVENTOR.
THOMAS A. WELLS
BY
ATTORNEY

ENDLESS REINFORCEMENT FOR PNEUMATIC TIRES

The tire industry in the United States recently has developed considerable interest in so-called belted tires. While tread reinforcing belts or breaker strips have been utilized for a considerable period of time with radial tires, such tires have not gained general acceptance in the United States because of the harsh riding qualities which are encountered with U.S. automobiles using such tires. More recently, with the emphasis on automotive safety, interest has developed to modify belted tires to suit U.S. cars. Belted tires which have been produced commercially in the U.S. to date utilize strips of bias cut woven fabric which are wrapped around the tire carcass and spliced together prior to the application of the sidewall and tread-forming rubber stock to the carcass. Such breaker strips generally have been made from fiberglass cords or metal wires. With both of these materials, a serious problem is encountered because of the great number of cut ends at each edge of the strip. Another problem is the inherent imbalance of such tires due to the splice in the strip.

It has been proposed in patent literature to utilize various types of belts made by winding a single cord in a zigzag fashion over the periphery of a drum. One such method is described in Vanzo Pat. No. 2,982,327. As set forth in the patent, the cord passes along a zigzag path from one edge of the breaker strip to the other with a plurality of reversals in each revolution. In subsequent revolutions of the drum, the path of the cord is controlled so the cord is laid adjacent to the previously positioned cord. A formula is given in the patent to determine the angle of the cord as it is laid in the zigzag pattern. It is apparent from this formula that the number of reversals in a single revolution must be a whole even number plus a small increment so that the cord will be laid in proper position adjacent to other cord. However, this factor can create serious limitations in the design of the belt structure by restricting possible variations and combinations of particular circumference, width and cord angles.

Another feature of the breaker strip of the Vanzo patent is the two separate and distinct plies or layers throughout its circumference. This relationship is illustrated particularly in FIG. 6 of the drawings of the Vanzo patent which shows the folding of a strip of parallel cords to form a breaker with a zigzag cord pattern. This two-ply construction permits one ply to move independently of the adjacent ply which may create undesirable shear planes in the final tire.

In accordance with the present invention, a novel reinforcement for a pneumatic tire provides a combination of the advantages of the bias cut woven fabric breaker strips with advantages of the single cord breakers while at the same time eliminating or minimizing the disadvantages of each type of breaker. Furthermore, the reinforcement of the invention provides additional advantages and benefits not heretofore attainable with such breakers.

The endless reinforcement strip for a pneumatic tire of the present invention comprises continuous cord forming a generally zigzag pattern and being positioned across the width of the strip from one side to the other at an angle to the edges of the strip with reversals at the edges. Lengths of the cord between reversals are interleaved with lengths disposed at an opposite angle along at least one line substantially parallel to and intermediate the edges of the strip.

The endless reinforcement strip of the invention usually is of a generally cylindrical form or configuration and is made from conventional tire cord materials such as fiberglass, rayon, polyester, nylon, cotton, metal wire and similar type cords. The dimensions of the strip may be varied over a considerable range depending upon the ultimate use thereof. For example, with strips which are to be applied to tire carcasses in flat band form, the circumference of the strip will be considerably smaller than the final circumference in the finished tire. Likewise, the original width of the strip will be substantially larger than the final width. This is due to the fact that generally during the expansion step in the forming of the tire the circumference of the strip will be substantially increased and the width will be significantly reduced. During this expansion the angle of the cord across the width of the strip from one side to the other as measured from the edge will usually be reduced to a substantial degree. With reinforcement strips which are applied to a carcass that has already been formed into the shape of a torus, i.e., a doughnut shape similar to that of the final tire, the dimensions of the strip will be substantially the same in its original form as applied to the carcass and in its final size in the finished tire.

The reinforcement strip preferably is formed from a minimum number of continuous cords so that the number of cut ends in the strip will be negligible. Ideally, the complete reinforcement is formed from a single continuous cord which forms the generally zigzag pattern of the strip. In this case, the two ends of the single cord are the only cut ends in the strip. Under some conditions, it may be desirable to form the reinforcement strip from several cords simultaneously with each of the cords being in the same generally zigzag pattern and being positioned similarly to the single cord but displaced therefrom. This may facilitate the production of a breaker strip in a short period of time. In either situation, it is apparent that the reinforcement strip of the invention is an endless strip thus eliminating splices which can lead to imbalance and possible premature failure of a tire.

The cord in the generally zigzag pattern is positioned across the width of the strip from one side to the other at an angle to the edges of the strip. In strips intended to be expanded, the initial angle of the cord in the strip is generally in the range of about 50° to 80° and preferably about 50° and 70° as measured from an edge of the strip. During expansion of such a strip, the angle of the cord generally will be reduced to an angle in the range of about 5° to 35°. With a reinforcement strip which is applied to a carcass after the carcass has been expanded, the angle of the cord is generally in the range of about 5° to 35°, that is, about the same angle as the final cord angle of expanded strips. It may be desirable with certain strip constructions to provide a change in the angle of the cord across the width of the strip. Thus, the angle of the cord in the portions thereof adjacent to the edges of the strip may be greater or less than the angle of the cord in the center portion of the strip. Such a construction may be advantageous where different reinforcement expansion characteristics are desired for particular shapes or types of tires.

As pointed out above, in the reinforcement strip of the invention, there is a reversal of the cord at the edges of the strip. Upon reversal of the cord, the succeeding length of cord is positioned in the zigzag pattern at approximately the same angle with respect to one edge as the previous length of cord prior to the reversal is with respect to the opposite edge. This provides a symmetrical cord position in the final strip and minimizes the possibility of imbalance in the tire.

The edges of the reinforcement strip of the invention may be distorted by providing cord reversals at points staggered with respect to other reversal points. Thus, the point of reversal for a given length of cord either may be closer to the center of the strip than normal or farther away as desired. Such a staggering of the reversal points provides a reinforcement with edges somewhat thinner than the main body of the strip.

Lengths of the cord between reversals in the strip of the invention are interleaved with lengths disposed at an opposite angle. This interleaving of the cord is along a line or zone substantially parallel to and intermediate the edges of the strip as set forth above. Advantageously, the interleaving results in at least two portions of a length of the cord being disposed on the outside of the strip and at least two portions thereof being disposed on the inside of the strip. This interleaving provides alternate portions on the outside and the inside of the strip along a length of the cord. Preferably, a single length has between about 2 and 250 portions disposed on the outside of the strip with a like number of portions being disposed on the inside thereof. The degree or extent of interleaving along a particular length will determine the number of interleaving lines or zones intermediate the edges of the strip. It is believed that increasing the number of interleaving lines facilitates the uniformity of expansion of a strip and increases the flexibility of a strip to accommodate differences in carcass dimensions. Also, if desired, another continuous cord can be disposed circumferentially of the strip and interleaved with the continuous cord forming the zigzag pattern.

It is advantageous that cord of the strip be covered with rubber prior to being formed into the generally zigzag pattern. This covering is particularly important when the cord is of a material which is easily abraded or degraded by rubbing contact, for example, fiberglass. Preferably, a coating of rubber is extruded around the cord immediately prior to the incorporation of the cord into the reinforcement strip.

Advantageously, the cord may be associated with a green or unvulcanized rubber layer or strip. The reinforcement strip may be produced by forming the cord in its generally zigzag pattern over the surface of such a rubber band or belt. Also, a rubber layer may be placed over the outer surface instead of or together with a second rubber layer on the inside of the strip. It may be desirable to provide rubber shoulder portions adjacent the edges of the strip. Such shoulder portions can be used with the cord strip alone or in combination with one or more rubber belts. The shoulder portions may assist in the positioning of the reinforcement strip with respect to the carcass so that the edges of the strip will be properly disposed in the final tire in relation to the center portion of the strip. Such shoulder portions are particularly useful in the production of tires in which it is desirable that the reinforcement strip be disposed equidistant from the tread surface at all points across the width thereof.

While the above description has been directed primarily to an endless reinforcement breaker strip for pneumatic tires it will be apparent that the reinforcement strip of the invention also may be utilized in other cord components of a tire, for example, for the carcass itself or for a unitized breaker/carcass assembly. Also, the reinforcement can be applied to a carcass in flat band form and expanded, e.g., to produce a belted bias ply tire or applied to an expanded carcass such as in the production of a radial ply tire. Furthermore, the reinforcement can be applied to a tire from which the tread has been removed, new tread stock applied and vulcanized to form a retread tire.

The invention will be further illustrated with reference to the accompanying drawings in which:

FIG. 1 is a fragmentary view of one embodiment of an endless reinforcement strip of the invention, FIG. 2 is a fragmentary view of another embodiment of an endless reinforcement strip of the invention, FIG. 3 is a fragmentary schematic view of a tire including an endless reinforcement strip of the invention, and FIG. 4 is a schematic illustration of one form of apparatus for forming an endless reinforcement strip of the invention.

Portions of typical endless reinforcement strips in accordance with the invention are shown in FIGS. 1 and 2 of the drawings. The reinforcement illustrated in FIG. 1 is similar to the one shown in FIG. 2 except that the number of interleaving lines is increased from 5 to 13. The angle of the cord in each case is approximately 60° and the width is approximately 7 inches. However, it will be seen that the number of interleaving lines is changed considerably from one reinforcement to the other. As shown in the Figures, cord is positioned on a green rubber belt 10 with cord lengths 11 interleaved with cord lengths 12 to form an interleaving line or zone 13. The reversal points 14 at the edges of the reinforcement are also clearly seen from these Figures.

In FIG. 3 showing a tire including a reinforcement of the invention, the reinforcement strip 21 is disposed within the carcass between the tread 22 and the carcass plies 23. It will be noted that the angle of the cords in the reinforcement strip 21 is considerably smaller than the cord angle in the reinforcements shown in FIGS. 1 and 2, as the angle is measured from an edge of the strip.

As shown in FIG. 4, one form of apparatus for forming the reinforcement strip of the invention includes a rotatable winding drum 31 having a generally cylindrical outer surface 32 providing a supporting surface for tire cord to be positioned thereon. Associated with the drum 31 is a cord guide means 33 mounted for movement on rod 34 for laying cord 30 in a desired zigzag pattern on drum surface 32. Drum 31 and cord guide means 33 are driven by a power source shown as motor 35. Motor 35 is drivingly connected through a belt and pulley arrangement 36 to a rotatable shaft 37. Shaft 37 is connected to a barrel cam 38 and to drive shaft 39 for drum 31 through a suitable gear train 40. A cam follower 42 connected to the cord guide 33 engages a groove 38a in the surface of cam 38. Groove 38a is of such a configuration that during rotation of the winding drum 31, cord guide 33 reciprocates across drum surface 32 transversely to the direction of rotation so that cord is laid in a zigzag pattern over surface 32.

Gear train 40 includes a gainer gear mechanism 43 to control the positioning of the cord on drum surface 32 during the subsequent rotation of the drum 31 so the cord being laid on the surface is in predetermined position with respect to other cord lengths. This control of the cord lay-down provides for the achievement of the desired cord pattern in the reinforcement strip and provides for the formation of a complete reinforcement strip, i.e., a strip in which the cord spacing and configuration is substantially uniform and in accordance with the preselected pattern.

In a preferred procedure for forming a reinforcement strip of the invention employing the apparatus shown in FIG. 4, winding drum 31 is continuously rotated to draw a length of rubber coated tire cord 30 which has been coated with unvulcanized green rubber at an extruder (not shown), over a guide 44, through cord guide 33 and onto drum surface 32. Simultaneously, the guide 33 reciprocates with respect to the surface of the drum 31 to lay the cord in a zigzag pattern on the surface thereof. As cord guide 33 approaches an edge of the drum surface, the movement of the guide is reversed by the cam 38 so as to provide a reversal of the cord pattern across the surface 32 in an opposite direction. The winding of the cord on the surface is continued until the surface is substantially covered. In this way an endless reinforcement strip is formed from a continuous cord without cut ends or cut edges.

The relationship of the speed of rotation of the drum 31 with respect to the movement of cord guide means 33 determines the extent of interleaving of the cords to form the interleaving line or lines which are substantially parallel to and intermediate the edges of the strip. Thus, with the reinforcement of the invention, the circumference, width, cord angle and end spacing each can be selected within close tolerances and still achieve an endless reinforcement strip with interleaving between the cord lengths to provide at least one interleaving line. With breaker strip configurations heretofore known, this was not attainable.

The invention will be described in greater detail with reference to the following examples which are intended to illustrate the invention without restricting the scope thereof.

EXAMPLE I

A reinforcement for a pneumatic tire is made on an apparatus as shown in FIG. 4 employing the following procedure. The circumference of the reinforcement is 48.75 inches and the width thereof is 6.951 inches. The angle of the cord is 59°. A belt having 5 interleaving lines as shown in FIG. 1 of the drawings is formed by winding a rubber coated fiberglass cord of about 0.019 inches diameter 67 revolutions of the drum with 5-56/67 cycles of the cord guide per drum revolution, one cycle being a return to the original position. The end count of the resulting strip is 9.36 cords per inch measured perpendicular to the cords.

The endless reinforcement strip is applied to a flat band tire carcass and tread and sidewall-forming rubber stock is placed over the breaker strip. The flat band assembly is shaped in the form of a torus under heat and pressure and vulcanized to form a tire. During the shaping process the circumference of the strip is increased to about 77.5 inches and the width thereof reduced to about 4.66 inches. The cord angle is about 35° as measured from an edge of the strip.

EXAMPLE II

The procedure of this example is the same as that of Example I except that the width of the reinforcement is 7.188 inches. A belt having 13 interleaving lines similar to that shown in FIG. 2 is formed after 73 drum revolutions with 5-47/73 cycles of the cord guide per revolution. The end count of the strip is 9.86 cords per inch.

EXAMPLE III

The procedure of this example is the same as that of Example I except that the belt has a circumference of 121.125 inches, a width of 7.482 inches, a cord angle of 20° and an end count of 14.51 cords per inch. A reinforcement having 36 interleaving lines is formed after 204 revolutions of the drum with 2-193/204 cycles of the cord guide per drum revolution. This reinforcement is used in a tire retreading operation by applying the reinforcement over a tire from which the tread has been buffed. Thereafter, tread stock is applied over the strip, and the assembly is vulcanized to form a retread truck tire.

The above description, drawings and examples show that the present invention provides a novel reinforcement for a pneumatic tire which overcomes the disadvantages of bias-cut fabric reinforcements and the problems of endless cord reinforcements heretofore known. The reinforcement strip of the invention provides a high degree of flexibility in the configuration and dimensions which can be employed. Thus, the cord angle as well as the width, circumference and/or end count can be preselected within close tolerances and still achieve a reinforcement which can be used in a particular tire size. Furthermore, the reinforcement of the invention is useful both for new tires and for retread tires. For new tires the reinforcement of the invention is not only useful in radial type tires where the reinforcement is applied after the carcass is shaped into the form of a torus, but also the strip is particularly suitable for use in tires made by flat band building methods in which the reinforcement is applied to the carcass in flat band form and expanded during the carcass shaping procedure. A further advantage of the reinforcement of the invention is the high degree of balance and symmetry which can be achieved in tires incorporating the reinforcement. This is due to the fact that the reinforcement is without a splice and also that the reinforcement does not contain separate plies which can create shear planes and transverse forces or side-thrust in a running tire.

It will be apparent to one skilled in the art that various modifications and variations in the procedures, materials and apparatus can be made within the scope of the invention. For example, with the apparatus shown and described the cord is wound on the outside of the drum surface, however, it may be advantageous under certain circumstances to form the strip in a different manner, e.g., the cord might be positioned on the inside of a drum rather than the outside thereof. Also, it will be understood that while a single reinforcement will generally replace a conventional two-ply breaker strip, more than one reinforcement or a reinforcement of extra thickness may be advantageous in certain applications. Therefore the foregoing description, drawings and examples are intended to illustrate preferred embodiments of the invention. The scope of the invention is to be limited only by the following claims.

That which I claim is:

1. An endless reinforcement strip for a pneumatic tire which comprises continuous rubber covered cord forming a generally zigzag pattern and being positioned across the entire width of said strip from one side to the other at an angle to the edges of said strip with reversals at the edges, and lengths of said cord between reversals being interleaved with lengths disposed at an opposite angle along at least one line substantially parallel to and intermediate the edges of said strip whereby each length of cord between reversals has portions disposed on both the inside and outside of said reinforcement strip, and said adjacent lengths of cord forming a plurality of triangular portions between said interleaving lines and lengths of cord disposed at said opposite angle.

2. An endless reinforcement strip according to claim 1 wherein at least two portions of a length of cord between reversals are disposed on the outside of said strip and at least two portions thereof are disposed on the inside of said strip.

3. An endless reinforcement strip according to claim 1 wherein between about 2 and 250 portions of said length of cord between reversals are disposed on the outside of said strip and between about 2 and 250 portions thereof are disposed on the inside of said strip.

4. An endless reinforcement strip according to claim 1 wherein said strip includes more than one cord.

5. An endless reinforcement strip according to claim 1 wherein said strip has a distorted edge with cord reversals staggered with respect to other reversal points.

6. An endless reinforcement strip according to claim 1 wherein the angle of the cord across the width of the strip changes between reversals.

7. An endless reinforcement strip according to claim 1 wherein continuous cord is disposed circumferentially of said strip and interleaved with the continuous cord forming the zigzag pattern.

8. An endless reinforcement strip according to claim 1 wherein the cord is associated with a green rubber belt.

9. An endless reinforcement strip according to claim 1 wherein rubber shoulder portions are disposed intermediate the edges of said strip and adjacent the edge portions thereof.

10. A method of producing an endless reinforcement strip for a pneumatic tire which comprises covering continuous cord with rubber, winding said continuous cord in a generally zigzag pattern on a substantially cylindrical surface, positioning said cord across the entire width of said strip from one side to the other at an angle to the edges of said strip, reversing the cord adjacent each edge of said strip and interleaving lengths of said cord between reversals with lengths disposed at an opposite angle along at least one line substantially parallel to and intermediate the edges of said strip and said adjacent lengths of cord forming a plurality of triangular portions between said interleaving lines and lengths of cord disposed at said opposite angle.

11. A method according to claim 10 wherein said lengths of cord are interleaved between reversals to provide alternate portions disposed on the outside and inside of said strip with at least two portions on each side.

12. A method according to claim 10 wherein between about 2 and 250 portions of said lengths of cord are disposed on each of the outside and inside of said strip.

13. A method according to claim 10 wherein more than one cord is employed to form said strip.

14. A method according to claim 10 wherein the cord is reversed at points staggered with respect to other reversal points to provide a distorted edge on the strip.

15. A method according to claim 10 wherein the angle of the cord across the width of the strip is changed between reversals.

16. A method according to claim 10 wherein continuous cord is disposed circumferentially of said strip and such cord is interleaved with the continuous cord forming the zigzag pattern.

17. A method according to claim 10 wherein the cord is associated with a green rubber belt.

18. A method according to claim 10 wherein rubber shoulder portions are disposed intermediate edges of said breaker strip and adjacent the edge portions thereof.

19. A method of making a pneumatic tire including the steps of applying an endless reinforcement strip to a tire carcass, applying tread-forming rubber over said strip and carcass, and vulcanizing said tire; said strip comprising continuous cord forming a generally zigzag pattern and being positioned across the entire width of said strip from one side to the other at an angle to the edges of said strip with reversals at the edges, and lengths of said cord between reversals being interleaved with lengths disposed at an opposite angle along at least one line substantially parallel to and intermediate the edges of said strip and said adjacent lengths of cord forming a plurality of triangular portions between said interleaving lines and lengths of cord disposed at said opposite angle.

20. A method according to claim 19 wherein said endless reinforcement strip is applied to said tire carcass in flat band form, sidewall and tread-forming green rubber is applied over said carcass and breaker strip assembly and the resulting assembly is shaped into the form of a torus under heat and pressure and simultaneously the circumference of the strip is substantially increased.

21. A method according to claim 20 wherein said tire cord changes position within said strip as the circumference thereof is substantially increased during the shaping step.

22. A pneumatic tire including the endless reinforcement strip of claim 1.

23. A pneumatic tire including the endless reinforcement strip of claim 3.